June 5, 1956   P. LAUNAY   2,748,825
QUARTER TURN DOWEL NUT FOR CAISSONS
Filed April 4, 1952   2 Sheets-Sheet 2
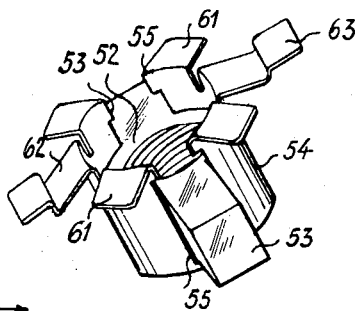
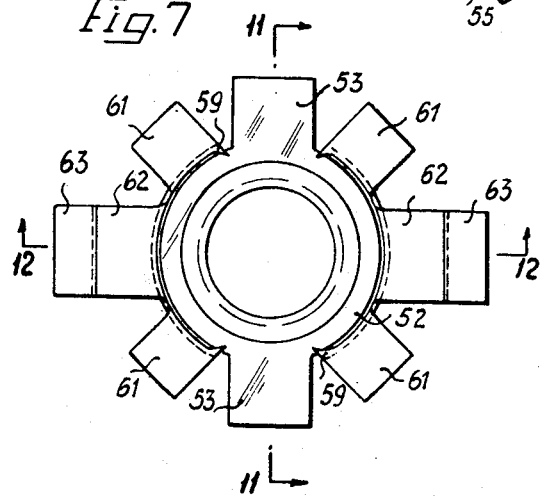
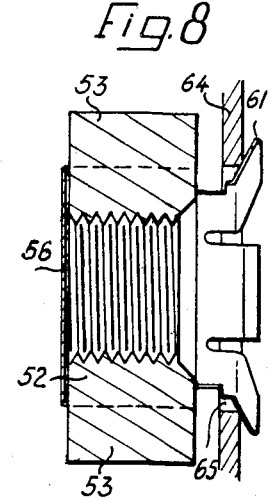
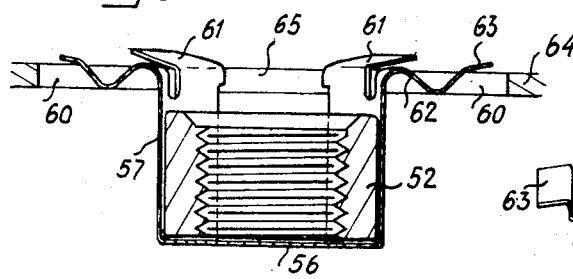
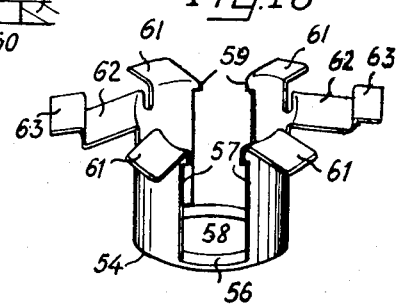
Inventor
Pierre Launay
by Brown + Seward
Attorneys

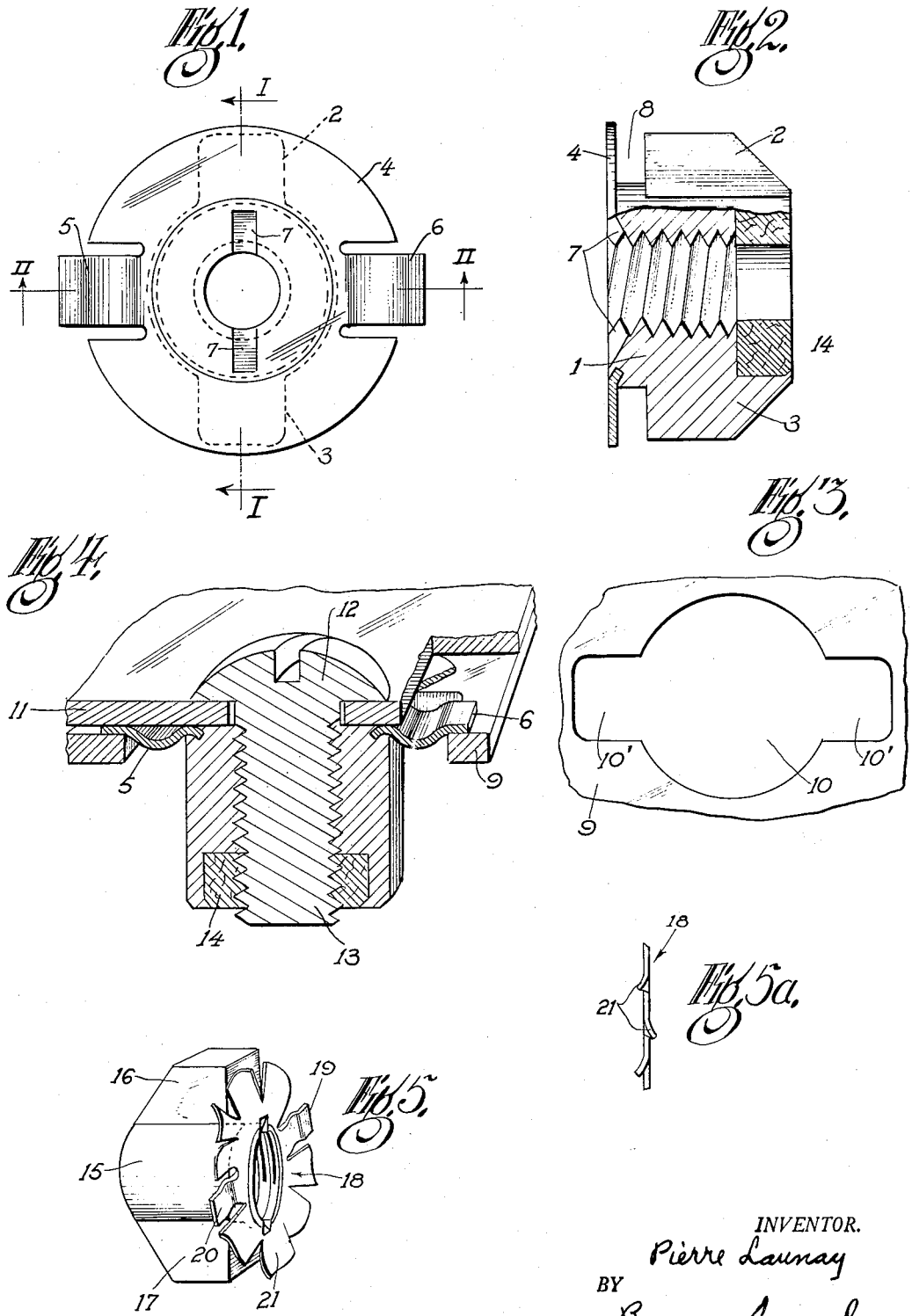

United States Patent Office 2,748,825
Patented June 5, 1956

2,748,825

QUARTER TURN DOWEL NUT FOR CAISSONS

Pierre Launay, Toulouse, Haute-Garonne, France

Application April 4, 1952, Serial No. 280,449

Claims priority, application France April 5, 1951

3 Claims. (Cl. 151—41.75)

The present invention relates to dowel nuts.

It is well known that the use of dowel nuts is quite appropriate for many steel construction industries, in particular for the motor vehicle and aviation industries, in which it becomes necessary, in the course of the construction, to fix, with screws and nuts, various elements on a plate, one face of which only remains accessible, because, for instance, the other face forms the inner wall of a closed or nearly closed caisson. In such conditions, as the nut cannot be assembled on the screw from the inaccessible face, said nut is first placed on this face through an opening bored accordingly in the plate, either previously, or just as the setting is performed, and for this reason nuts of this kind are called dowel nuts.

The dowel nuts known up to now include therefore, on their front part, a tubular extension by means of which, with suitable tools, a sort of lateral expansion is produced resulting in a metal eyelet embracing on its two faces the edges of the opening bored in the plate. The nuts have to be, in such a case, or at least in their expanding parts, made of a malleable material, of aluminum for instance; if the dowel nut itself is malleable, the threads will necessarily be deformable, and in any case the load on the nut is borne by a malleable part (the fixation eyelet) so that if this part gives way, nothing will stop the nut from emerging through the opening used for the setting. In addition, the expansion has to be carried on with great care, is a slow work needing specialists and is therefore costly.

On the contrary, the device according to the present invention includes essentially a wing nut cooperating with a notched opening, bored in the plate, and a gripping and locking member to grip the nut and to lock it in its position after it has been slightly rotated, a quarter turn for instance.

The setting of the nut consists thereby in a bayonet joint, and the main advantages of this setting, when compared with the known dowel nuts, are the following:

The wings provide a direct bearing against the plate for a nut which can be made of as strong a material as one wishes.

The setting can be carried on very quickly by an unskilled labourer.

According to a first embodiment of this type of nut, the gripping and locking member consists in a very thin metallic washer set at the end of the nut and from which are cut out two radially extending tongues which, slightly entering in the notches of the opening in the plate, ensure the fixing and the locking of the nut. A separate screw brake may be provided to prevent the unscrewing of the screw in relation to the nut.

According to a second embodiment, the member for gripping and locking the nut on the plate forms also the nut brake.

If the gripping and locking member is the thin washer with tongues described in the first embodiment, this washer may be made of springy steel and may have its periphery provided with waves or raised serrations which are produced for instance by a series of nicks cut in the edge of the washer.

These raised serrations form between the plate over which is fixed the dowel nut and the construction element fixed to the plate an elastic cushion, damping the impacts and thereby preventing deformation of the threads of the nut and the screw which would tend to loosen the fastening.

The accompanying drawings show by way of example several embodiments according to the invention.

Fig. 1 is a plan view of a first embodiment of the nut according to the invention.

Fig. 2 is a diametral section, along the line I—I of Fig. 1.

Fig. 3 shows, in plan, a plate with an opening having lateral notches for the passing of the body of the nut.

Fig. 4 shows, in vertical section and in perspective, a joint made with a nut such as shown in Figs. 1 and 2.

Fig. 5 shows, in perspective, a second embodiment of the dowel nut.

Fig. 5a is an edge view of the washer shown in Fig. 5.

Fig. 6 is a perspective view of a nut assembly comprising a nut body and a socket member therefor, this assembly constituting a further embodiment of the invention.

Fig. 7 is a top plan view of the nut assembly shown in Fig. 6.

Figs. 8 and 9 show the nut assembly in operative position, the figures being sections on the lines XI—XI and XII—XII, respectively, of Fig. 7.

Fig. 10 is a perspective view of the socket member of the nut assembly.

According to Figs. 1 and 2, the dowel nut 1 bears two diametrally opposite wings 2, 3. The whole nut is made of as strong a material as desired; for instance, steel of any suitable grade. On the upper surface of the nut is set a washer 4, made of thin springy steel. The washer is provided with two slightly corrugated tongues 5, 6 and is set on the nut so that the axis of the tongues is perpendicular to the axis of the wings 2, 3. In addition, a slot 7 in the washer allows the introduction of a screw driver.

Between the upper face of the nut 1 and the set washer 4, is left a space 8 corresponding to the thickness of the plate over which the nut is to be fixed.

To place the nut in a work piece, the body 1 and the wings 2, 3 are introduced through an opening in the plate 9, formed by a round hole 10 with two notches 10', 10' at both ends of a diameter; the nut is turned a quarter turn by means of a screw driver engaged in the slot 7 so that the tongues 5, 6 are placed opposite the notches 10', 10' of the hole 10 in the plate; they spring downward or are forced into these notches to prevent the nut from turning, and the wings 2, 3 are then located, under the plate 9, in a plane diametrally perpendicular to the plane of the tongues 5, 6. A second plate 11, previously perforated, is placed on the plate 9 and fixed by means of the screw or bolt 12, the threaded body of which (13) is screwed into the annular screw brake 14 (Figs. 1 and 4) of deformable material set in a recess provided at the lower part of the nut.

As shown in Figures 1 to 4, the nut body has a diameter to fill the circular aperture with relatively small clearance. The wing portions 2 and 3 are plate-like arms extending radially from the body 1 on opposite sides thereof substantially throughout the length of the body, the thickness dimension of the wings normal to their common plane being relatively narrow with respect to the diameter of the cylindrical body portion 1, and the width dimension of the wings as measured parallel with the axis of the body preferably being greater than the thickness. The narrow faces of the wings adjacent the washer 4 form abutment shoulders for engaging one face of the apertured plate 9, and the washer 4 forms a circular flange abutment for engaging the other face of plate 9. As shown in Figure 4, portions of resilient fingers 5 and 6 are bent out of the plane of washer 4 and constitute locking portions which enter notches 10' and prevent turning of the nut about its axis in either direction.

Fig. 5 shows an alternate embodiment of the nut of Figs. 1, 2, in which the nut 15 is equipped, as before, with two diametrally placed wings 16, 17, the whole nut being made of any suitable material, for instance, of steel. At the upper end of the nut is set a thin washer 18, made of springy steel, having, if desired, a slot similar to the slot 7 of Fig. 2. This washer includes two slightly corrugated tongues 19, 20 and has been indented around its periphery so as to form a series of serrations 21, the ends of which are bent up in the manner of a "lock washer."

Between the upper part of the nut 15 and the washer 18 with its serrations 21, a space has been left corresponding to the thickness of the plate on which the nut is to be fixed, for instance the plate 9 of Fig. 4.

The setting of the nut of Fig. 5 is carried on in the same way as for the nut of Figs. 1 and 2, the tongues 19, 20 engaging the notches 10', 10' and the teeth of the serrations 21 acting to prevent loosening of the screw by providing a certain amount of resilience between the connected parts.

Figs. 6 to 10 illustrate a modified nut assembly of two pieces, namely an internally threaded nut body 52 having two diametrically opposed wings 53 extending along the entire length of the nut body, and a socket member 54 consisting of an apertured base 56 provided with a depending skirt 57 having a greater length than the nut body 52. The aperture 58 of the base 56 has a diameter corresponding to that of the threaded aperture of the nut body. Skirt 57 is provided with two diametrically opposed longitudinal slots 55 extending over the entire length of the skirt. By having nut body 52 and socket member 54 of substantially the same contour, they will fit together so that the nut body may be lodged within the socket member and retained therein by the base 56 while the wings 53 of the nut body will extend through the slots 55 so as to be guided by the same for axial displacements, the object being that turning movement of the nut body shall carry with it the socket member, and vice versa. If desired, the longitudinal edges of the slots 55 may be formed with slightly projecting lug portions 59 adapted to insure against accidental or unintentional separation of the assembled nut members 52 and 54.

The edge of skirt 57 is bent so as to form two radial flange portions which are slit to provide a plurality of radial fingers 61 two of which, namely the diametrically opposed fingers 62, extend in a direction perpendicular to that in which extend the shoulders 53 of the nut body 52. The fingers 62 are bent slightly downwards and terminate in upwardly directed curved resilient prongs 63.

In inserting the nut assembly into position, the base 56 of socket member 54 is passed through the aperture 65 of a member 64, this aperture being provided with radial extensions 60 similar to those described with reference to Fig. 4. Simultaneously, the nut body lodged within the skirt of socket member 54 is passed through aperture 65 in a position such that the wings 53 can pass through the extensions 60 of the aperture. When the socket member is in a position in which the fingers 61 and 62 are in abutting contact with the apertured member 64, the nut assembly may be rotated in order to render the wings 53 operative to retain the nut assembly on member 64. By rotating the nut assembly about an angle of substantially 90°, the downwardly projecting portions of fingers 62 will enter the radial notch extensions 60 of aperture 65 to thereby lock the nut assembly against any further turning movement.

In the modification shown in Figures 6 to 10, it will be noted that the flange portions 61 are in a circular array and constitute circular flange means serving the same function as the washer 4 in Figures 1 to 4, and the resilient fingers 62 serve the same function as fingers 5 and 6 in Figures 1 to 4.

The nut body 52 being capable of axial displacements within socket member 54, it will be apparent that the thickness of the apertured member 64 may vary within certain limits.

Though in the preferred embodiment of a dowel nut, which has been described and represented, the wings or shoulders are aligned along a diameter perpendicular to the diameter of the locking tongues, it must be understood that, without departing from the scope of the invention, these two diameters can form any angle so long as the wings or shoulders are turned out of the plane of the aperture extensions.

This application is a continuation-in-part of my application Ser. No. 205,301, filed January 10, 1951.

What is claimed is:

1. A nut to be secured on a plate having a circular aperture provided with two diametrically opposed radially extending notches, said nut comprising an internally threaded cylindrical body portion of a diameter to fill said circular aperture with relatively small clearance, a pair of plate-like wing portions extending radially from said body portion, on opposite sides thereof substantially throughout the length of the body, said wings being located in a common plane containing the axis of said nut body, the thickness of said wing portions normal to said common plane being relatively narrow with respect to the diameter of said body portion, and the narrow faces along one edge of said wings forming shoulders for engaging one face of said apertured plate, circular flange means arranged adjacent one end of said nut body and spaced from the plane of said shoulders by a distance at least equal to the thickness of said apertured plate and forming an abutment for engaging the other face of said apertured plate, means connecting said flange means with said nut body to turn in fixed relation with said body, said circular flange means embodying a pair of resilient fingers extending radially outward beyond said nut body in opposite directions and at right angles to said wing portions, each of said resilient fingers having locking portions extending out of the plane of said circular flange means and towards the plane of said shoulders and having a width less than the width of said notches, said wing portions having a size permitting them to be passed through said notches and rotated out of the plane of said notches and into a position where said locking portions of said resilient fingers enter said notches and lock said nut body against rotation about its axis in either direction.

2. A nut according to claim 1 wherein said circular flange means comprises a washer secured at its inner peripheral edge to one end of said cylindrical nut body.

3. A nut according to claim 1 and including a cylindrical socket member surrounding the body portion of said nut with the wing portions thereof projecting through longitudinal slots in said socket member, and said circular flange means being carried by said socket member at one end thereof, said socket member and the slots therein being longer than said nut body whereby said nut body may slide axially within said socket member.

References Cited in the file of this patent

UNITED STATES PATENTS

| 1,711,453 | Carr | Apr. 30, 1929 |
| 1,744,488 | Mitchell | Jan. 21, 1930 |
| 2,233,242 | Burke | Feb. 25, 1941 |
| 2,318,840 | Del Camp | May 11, 1943 |
| 2,681,679 | Poupitch | June 22, 1954 |